Dec. 25, 1928.
J. PEYSER
1,696,360
SPEED ACCELERATOR FOR TRAVELING CONTAINERS OR BODIES
Filed Dec. 31, 1926  2 Sheets-Sheet 1
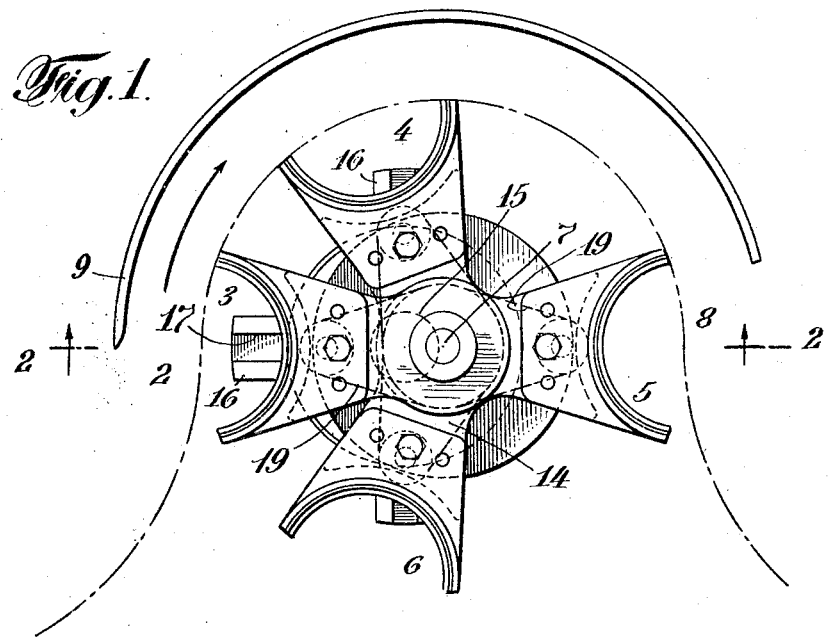
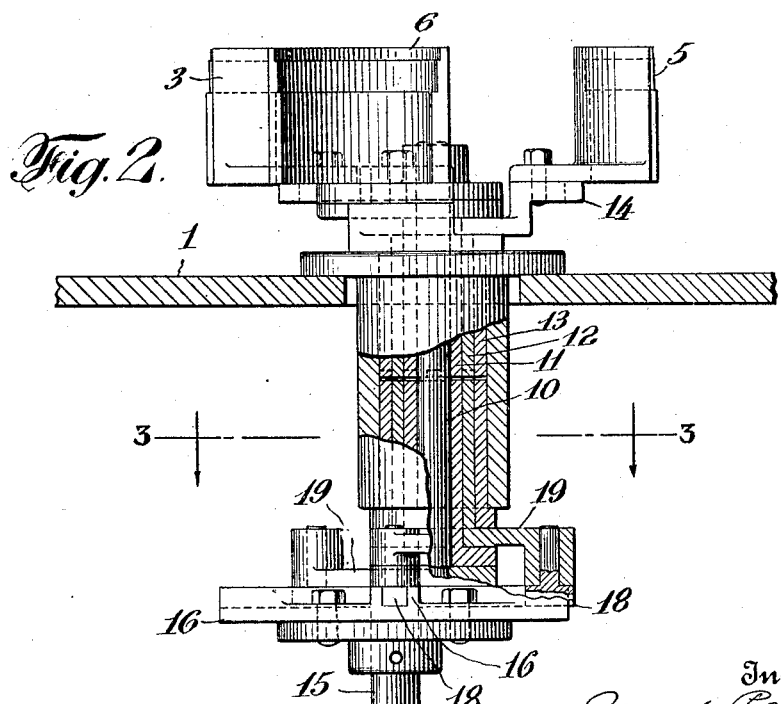

Dec. 25, 1928.  
J. PEYSER  
1,696,360  
SPEED ACCELERATOR FOR TRAVELING CONTAINERS OR BODIES  
Filed Dec. 31, 1926  2 Sheets-Sheet 2
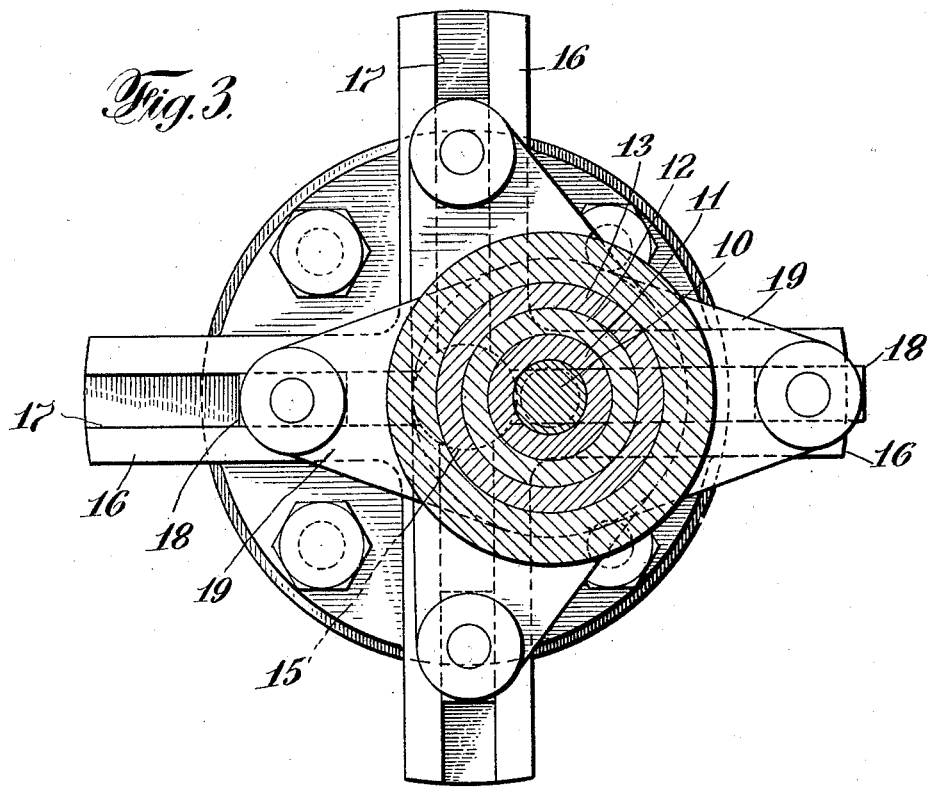
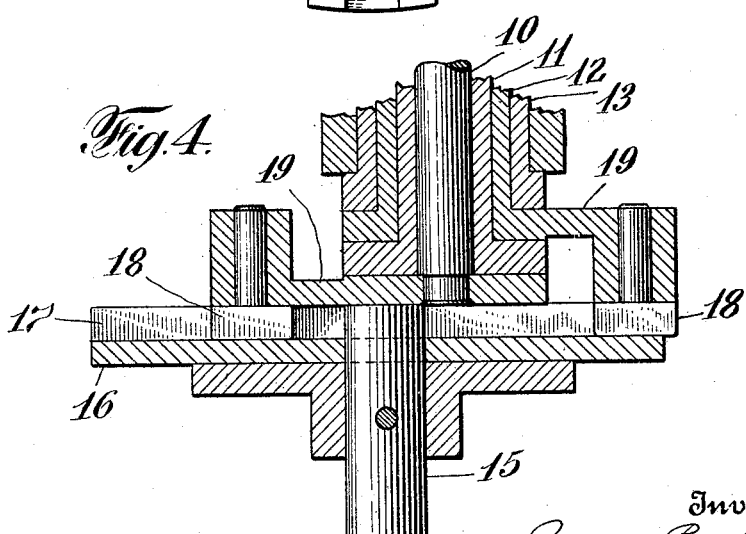

Patented Dec. 25, 1928.

1,696,360

UNITED STATES PATENT OFFICE.

JOSEPH PEYSER, OF MOUNT VERNON, NEW YORK.

SPEED ACCELERATOR FOR TRAVELING CONTAINERS OR BODIES.

Application filed December 31, 1926. Serial No. 158,395.

This invention relates to devices for accelerating the speed of traveling containers or bodies and has for its main object and feature the provision of simple means for effectually accomplishing this.

The invention is disclosed in one concrete and preferred form in the accompanying drawings in which:

Fig. 1 is a top plan view, with support 1 omitted, of a device embodying the invention.

Fig. 2 is a vertical sectional view substantially on the plane of line 2—2 of Fig. 1.

Fig. 3 is a horizontal sectional view substantially on the plane of line 3—3 of Fig. 2.

Fig. 4 is an enlarged sectional view of the actuating means.

In the art of transporting containers such as tin cans or bodies to a seaming or other machine, it is customary to separate bodies advancing in crowded procession, and to accelerate the speed thereof. It is, however, exceedingly difficult to separate the bodies and accelerate the speed thereof to a sufficient extent at any one station and it is therefore desirable, at another station, to still further separate the bodies and accelerate their speed. The device about to be described will effectually do this work.

1 indicates a support or disk that may be either movable or stationary to which bodies are fed at the point 2, said bodies arriving in spaced relation at a certain speed. 3, 4, 5 and 6 indicate body propelling members, rotatable around a common center 7, that engage successive bodies and advance them over the disk until the exit point, indicated at 8, is reached. 9 is a wall extending over a portion of disk 1 and against which the bodies travel. The curve of the wall and the orbit of the body-propelling members are concentric with respect to each other.

10, 11, 12 and 13 are a plurality of rotatable shafts one within the other and concentric with respect to each other, each of which shafts carries a bracket or radial arm 14 that in turn carries a body-propelling element above support 1. 15 is a rotating shaft eccentrically disposed with respect to the common center of shafts 10, 11, 12 and 13. Carried by shaft 15 is a spider 16 having a number of radial guides 17 and into these guides extend shoes 18, each shoe being carried by an arm 19, and each of shafts 10, 11, 12 and 13 carrying an arm. The shoes are slidable in the guides and shafts 10, 11, 12 and 13 are rotatable independently one of the other. It will now be understood that rotation of shaft 15 will cause shafts 10, 11, 12 and 13 to be driven by reason of guides 17, shoes 18 and arms 19 and thence motion will be imparted to the body-propelling elements: but, owing to the fact that the center of rotation of shaft 15 is eccentric with respect to the center of shafts 10, 11, 12 and 13, it will be understood that said latter shafts, and, consequently, the body-impelling elements, will move at different speeds at different times during a cycle of revolution. The eccentricity of the parts is therefore so arranged with respect to in-feed point 2 and exit point 8 that each impelling element will travel substantially at the speed of the container or body at point 2 so that the impelling element will readily engage said body and that thereafter the speed of said impelling element is gradually accelerated until the container or body leaves at point 8, and that thereafter the speed of the impelling element is decelerated until it is again substantially equal to the speed of the in-feeding body.

I claim:

1. A body accelerator comprising: a support, a plurality of shafts one within the other and rotatable around a common center, a body propelling element carried by each shaft above the support, a plurality of guides rotating about a common center eccentric with respect to that of the shafts, and a shoe carried by each shaft, extending into a guide and slidable therein.

2. A body accelerator comprising: a support, a plurality of shafts one within the other and rotatable around a common center, a body propelling element carried by each shaft above the support, a plurality of radially extending guides rotating about a common center eccentric with respect to that of the shafts, and a shoe carried by each shaft, extending into a guide and slidable therein.

3. A body accelerator comprising: a support, a curvilinear wall, a plurality of shafts one within the other rotatable about a common center and in a path substantially concentric with that of the wall, a body propelling element carried by each shaft above the support, a plurality of guides rotating about a common center eccentric with respect to that of the shafts, and a shoe, carried by each shaft, extending into a guide and slidable therein.

Signed at New York, in the county of New York, and State of New York, this 27th day of December, 1926.

JOSEPH PEYSER.